United States Patent [19]

Galletti

[11] Patent Number: 5,059,323
[45] Date of Patent: Oct. 22, 1991

[54] SELF-CLEANING VACUUM FILTER WITH PERMANENT, ENDLESS FILTER MEDIA PARTICULARLY FOR INDUSTRIAL LUBRICATING AND COOLING LIQUIDS

[75] Inventor: Alfonso Galletti, Turin, Italy
[73] Assignee: GI.PI. S.r.l., Turin, Italy
[21] Appl. No.: 548,539
[22] Filed: Jul. 5, 1990
[30] Foreign Application Priority Data Jul. 5, 1989 [IT] Italy .................. 67555 A/89

[51] Int. Cl.$^5$ .......................... B01D 33/056
[52] U.S. Cl. ..................... 210/400; 162/348; 209/307
[58] Field of Search ............. 210/400, 401; 162/348; 209/307

[56] References Cited

U.S. PATENT DOCUMENTS 4,310,414 1/1982 Lux ..................... 210/238

Primary Examiner—Frank Sever
Attorney, Agent, or Firm—Sughrue, Mion, Zinn, Macpeak & Seas

[57] ABSTRACT

A self-cleaning vacuum filter (1), particularly for industrial lubricating and cooling liquids, has a filter bed (3) which is housed in a tank (2) for the liquid to be filtered and communicates at the bottom with an intake chamber (5) for the liquid. The filter bed includes a screen (4) and an endless loop for regenerable filter fabric (17) whose surface (17c) on which the filtered material is deposited always faces outwardly of the loop.

7 Claims, 2 Drawing Sheets

SELF-CLEANING VACUUM FILTER WITH PERMANENT, ENDLESS FILTER MEDIA PARTICULARLY FOR INDUSTRIAL LUBRICATING AND COOLING LIQUIDS

BACKGROUND OF THE INVENTION

The present invention relates in general to industrial filters, particularly for lubricating and cooling liquids for machine tools and the like.

More particularly, the invention relates to a self-cleaning vacuum filter with a permanent, endless filter medium, including a tank for the liquid to be filtered containing a filter bed which communicates interiorly with a vacuum chamber connected to means for drawing the liquid through the filter medium, and in which the filter bed includes a screen and an endless loop of regenerable filter fabric having return rollers and movable in steps, by motor-driven entrainment means, over the screen and through a station for the removal of the filtered material emerging from the tank.

The main problem connected with filters of this type results from the difficulties of separating and removing the filtered material from the filter fabric and the consequent difficulty of effectively regenerating the fabric. In particular, in known filters of the type specified above, the path of the filter fabric is such that its surface on which the filtered material is deposited normally faces inwardly of the loop so that, in the regions where it passes over the return rollers, the filtered material is squashed and compacted against the fabric, forming a very tenacious, pasty layer which is not at all easy to remove.

SUMMARY OF THE INVENTION

The object of the present invention is to avoid this problem and to provide a self-cleaning vacuum filter of the type defined at the beginning, which is formed so that the complete removal of the filtered material from the filter fabric is simpler and easier and which is therefore considerably more effective in operation.

According to the invention, this object is achieved by means of a self-cleaning vacuum filter, particularly for industrial lubricating and cooling liquids, including a tank for the liquid to be filtered having a bottom wall, a vacuum chamber and a filter bed within the tank, said filter bed including a screen placed above the vacuum chamber and an endless loop of regenerable filter fabric having a return pass and side edges, return rollers disposed in engagement with an inner surface of the endless loop of filter fabric for supporting the endless loop of filter fabric, means for drawing the liquid through the filter bed, a station for the removable of the filter material emerging from the tank, and motor-driven entrainment means for moving the said filter fabric in steps over the screen and through the said removal station, wherein the vacuum chamber with the filter bed is submersed in the liquid within the tank adjacent the bottom wall of the tank, the endless loop of filter fabric is also placed adjacent the bottom wall of the tank and passes over the return rollers with its return pass extending beneath the vacuum chamber from the removal station to the filter bed said return rollers being disposed only in engagement with an inner surface of the loop, whereby in use the surface of the endless loop on which the filtered material is deposited always faces outwardly of the loop, and wherein pressure means for keeping the side edges of the filter fabric substantially in sealing contact with the corresponding sides of the screen of the filter bed are provided in the tank above the said filter fabric, said pressure means being comprised of a pair of endless entrainment chain means disposed above said endless loop of filter fabric in contact with said side edges of said fabric.

This prevents the filtered material from being squashed and compacted against the fabric and thus considerably facilitates its removal therefrom at the removal station.

The removal station simply comprises a return roller over which the fabric passes at the beginning of its return pass to form a loop with a small radius of curvature where the filtered material becomes separated from the fabric.

In order to facilitate the separation, the removal station conveniently includes a drying unit which is situated immediately upstream of the return roller and is connected to a suction source. The suction source is conveniently constituted by an ejector by means of which some of the filtered liquid drawn through the filter bed is supplied to a compensation vessel which can be connected to the vacuum chamber of the tank.

Conveniently, the side edges of the fabric have longitudinal strips and the pressure means include a pair of endless chains with rollers which are offset from the central parts of their links, the rollers being arranged in rolling contact with respective guides carried by the tank above the sides of the screen so as to urge the links of the chain against the longitudinal strips of the filter fabric.

The two chains are preferably interconnected by spaced transverse elements.

According to a further characteristic of the invention, the filter also includes nozzles which can be supplied with the filtered liquid admitted to the compensation vessel in order to wash the return pass of the fabric.

The filter fabric may be constituted by a single endless belt or, more advantageously, by portions interconnected by fasteners. With large filters, this configuration considerably facilitates the renewal of any worn or clogged parts of the filter fabric.

BRIEF DESCRIPTION OF THE DRAWINGS

The invention will now be described in detail with reference to the appended drawings, provided purely by way of non-limiting example, in which.

DETAILED DESCRIPTION OF THE INVENTION

Figure 1:
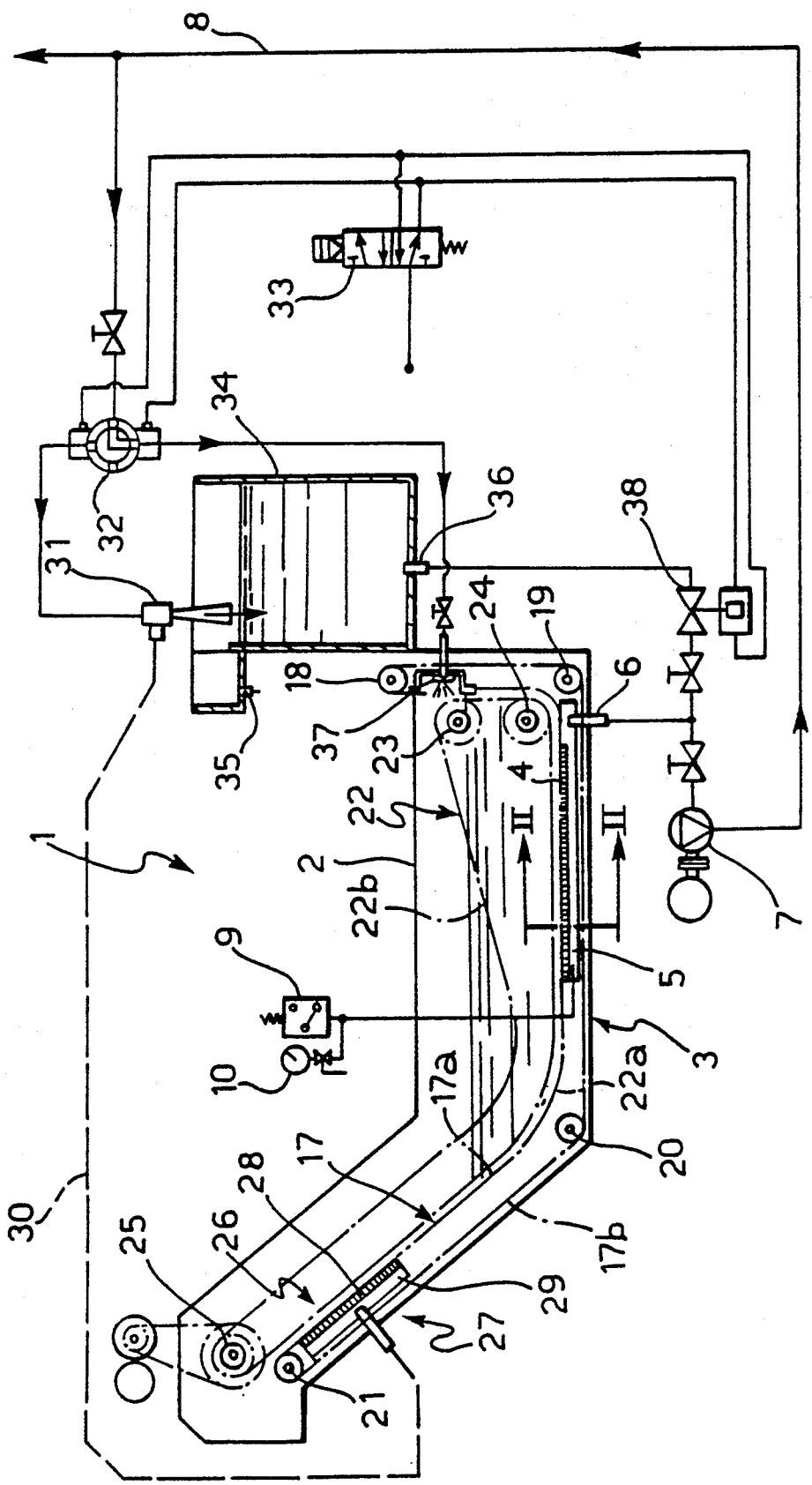
FIG. 1 is a partially-sectioned and partially-diagrammatic schematic view of a self-cleaning vacuum filter according to the invention.

With reference to the drawings, a self-cleaning vacuum filter according to the invention is generally indicated 1 and includes a tank 2 which is intended to be supplied with the liquid to be filtered and has a filter bed, generally indicated 3 at its bottom.

In generally known manner, the filter bed 3 includes a filter screen which defines the top of a vacuum chamber 5 connected by a connector 6 at one side of its bottom to the intake side of an electric pump 7 whose delivery is connected to a circuit 8 for supplying the filtered liquid to the user. A vacuum switch, schematically indicated 9, is inserted in the vacuum chamber 5 and is connected to a vacuum gauge 10 whose function will be explained below.

Figure 2:
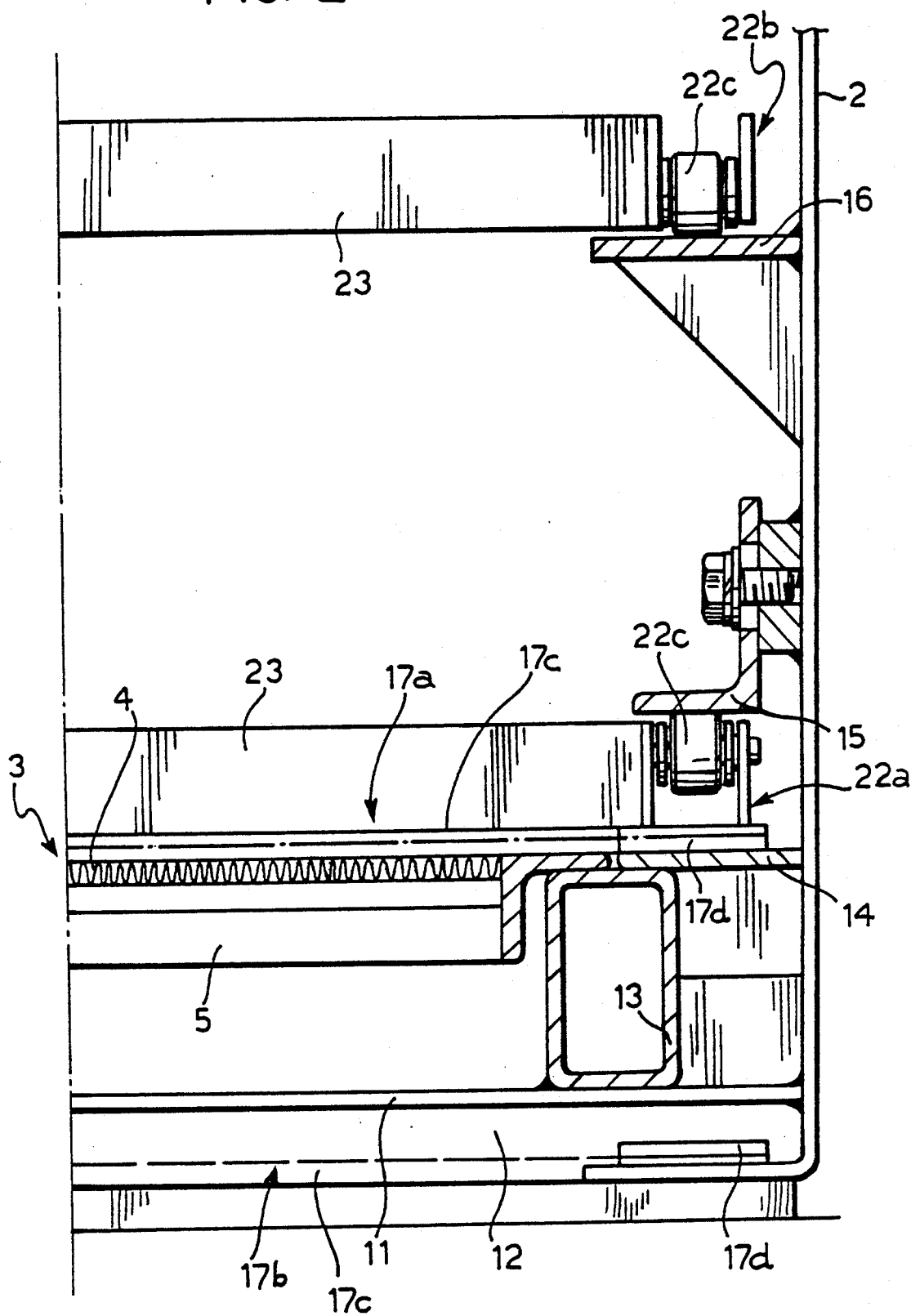
FIG. 2 is a cross-section taken on the line II—II of FIG. 1, on an enlarged scale.

As can be seen better in FIG. 2, the bottom of the vacuum chamber 5 that is, the side opposite the screen 4 is defined by a base wall 11 which is spaced from the bottom of the tank 2 so as to define a space 12 therewith. Moreover, in correspondence with the side walls 13 of the chamber 5, that is, beside the screen 4, the tank 2 carries two support elements 14 (only one of which is indicated in FIG. 2) above which respective guides 15 are mounted. Above the guides 15, the tank 2 carries two further support brackets 16 (only one of which is shown in FIG. 2).

The filter bed 3 also includes an endless loop of regenerable filter fabric 17 which passes around idle return rollers 18, 10, 20 and 21. Between the rollers, the fabric 17 defines an active outward pass 17a the central horizontal portion of which rests on the screen 4 substantially with a lateral seal, as explained below, and a return pass 17b. As is clear from the drawings, the arrangement of the rollers 18-21 is such that the loop defined by the fabric 17 always has its surface on which the filtered material is deposited (indicated 17c in FIG. 2) facing outwardly of the loop. In effect, the return pass 17b is situated beneath the active pass 17a and extends through the space 12 defined between the base 11 of the vacuum chamber 5 and the bottom of the tank 2.

The filter fabric 17 can be moved over the screen 4 of the filter bed 3 in steps by means of an entrainment system including a pair of endless chains 22 which pass around respective return rollers 23, 24 and 25, the last of which is motor-driven.

The two chains 22, which are interconnected by transverse elements 23, have lower entrainment passes 22a which follow the path of the active pass 17a of the filter fabric 17 and respective return passes 22b which extend on the opposite side of the outward passes 17a and 22a from the return pass 17b of the fabric 17.

With reference again to FIG. 2, the fabric 17 has longitudinal strips 17d normally of elastomeric material or the like, along its side edges, and these bear slidably against the elements 14 in the portion of the active pass 17a corresponding to the filter bed 3 and are pressed against them by the entrainment passes 22a of the two chains 22. This is achieved by virtue of the fact that the chains 22 have respective rollers 22c which are offset from the central planes of the respective links and, in the portions of the conveyor passes 17a corresponding to the filter bed 3, are urged upwardly into rolling contact with the respective guides 15, whereby their links keep the side strips 17d of the fabric 17 firmly in sliding contact with the support elements 14. A substantially hermetic seal against the sides of the screen 4, and hence of the vacuum chamber 5, is thus achieved.

The upper return passes 22b of the chains 22 bear on the brackets 10 of the tank 2 by means of their rollers 22c, as shown in detail in FIG. 2.

The station for the removal of the filtered material from the fabric 17 is generally indicated 26 and is of course downstream of the filter bed 3. The removal station 26 is arranged outside and above the tank 2 and includes the return roller 21 and a drying unit 27 immediately upstream of the roller 21. The unit 27 includes a grid 28 against which the end portion of the active pass 17a of the fabric 17 bears and which defines a vacuum chamber 29 connected to a pneumatic vacuum source 31 by a tube 30. The drying unit 27 dries the filtered material deposited on the active portion of the pass 17a of the fabric 17 so as to facilitate its subsequent removal therefrom as a result of the passage of the fabric 17 over the return roller 21.

The vacuum source 31 is constituted by an ejector whereby some of the filtered liquid taken in by the pump 7 can be diverted, by means of a diverter valve 32 which is operable by an electrical pneumatic distributor 33 for admission to a compensation vessel 34 mounted above the tank 2. The compensation vessel 34 has an overflow outlet 35 at the top and a connector 36 at the bottom which can be put into communication with the connector 6 at the bottom of the vacuum chamber 5 by means of a pneumatically-controlled valve 38 controlled by the same pneumatic distributor 33.

A group of washing nozzles, indicated 37, is situated in correspondence with the initial vertical portion of the active pass 17a of the fabric 17, beneath the return roller 18, and can be supplied with filtered liquid from the delivery duct 8 by means of the same diverter valve 32.

In operation, the lubricating and cooling liquid to be filtered is admitted to the tank 2 from above and is drawn by the pump 7 into the vacuum chamber 5, passing through the screen 4 and the portion of the fabric 17 which is held against it by the chains 22. Whilst the filtered liquid is recycled by the pump 7 to the lubricating and cooling circuits of the machine tools, the filtered material collects on the portion of the fabric 17. As soon as the vacuum in the chamber 5 reaches a predetermined threshold level, the vacuum switch generates a signal which enables the geared motor unit 25 to be activated, causing the fabric 17 entrained by the chains 22 to be advanced by a preset distance. A "clean" portion of the fabric 17 is thus arranged in correspondence with the filter bed 3, whilst the preceding portion is carried towards the removal station 26. In order to enable the fabric 17 to move during this stage, the valve 38 is opened by the distributor 33, which is itself piloted by the vacuum switch 9 or a timer, to put the lower connector into communication with the compensation container 34 and eliminate the vacuum in the chamber 5.

At the end of this stage, communication between the compensation vessel 34 and the vacuum chamber 5 is cut off again and the pump 7 draws the liquid from the chamber 5 again, supplying the users and re-establishing the level of the filtered liquid in the compensation vessel 34 through the diverter valve 32 operated by the solenoid valve 33 and the ejector 31. At this stage, as a result of the connection between the ejector 31 and the drying unit 27, suction is generated in the vacuum chamber 20 of the latter and this dessicates or dries the filtered material previously collected on the fabric 17. The dried filtered material is thus easily separated and removed from the fabric 17 as it passes over the return roller 21 during the next advance cycle of the fabric 17. The detached filtered material removed is collected in a suitable underlying container and is subsequently disposed of.

During the filtering cycle, the diverter valve 32 operated by the solenoid valve 33 sends some of the liquid supplied to the delivery duct 8 by the pump 7 to the nozzles 37 which wash that region of the fabric 17 which will be situated in correspondence with the filter bed 3 after the next advance cycle.

It should be noted that the filter fabric 17 may be constituted by a continuous belt or, more advantageously, by a series of portions interconnected by simple sliding-clasp fasteners. The latter configuration enables the easy renewal of any regions of the fabric 17 which are worn or excessively clogged by the filtered material.

What is claimed is:

1. A self-cleaning vacuum filter, particularly for industrial lubricating and cooling liquids, including a tank for the liquid to be filtered having a bottom wall, a vacuum chamber and a filter bed within the tank, said filter bed including a screen placed above the vacuum chamber and an endless loop of regenerable filter fabric having a return pass and side edges, return rollers disposed in engagement with an inner surface of the endless loop of filter fabric for supporting the endless loop of filter fabric, means for drawing the liquid through the filter bed, a station for the removable of the filtered material emerging from the tank, and motor-driven entrainment means for moving the said filter fabric in steps over the screen and through the said removal station, wherein the vacuum chamber with the filter bed is submersed in the liquid within the tank adjacent the bottom wall of the tank, the endless loop of filter fabric is also placed adjacent the bottom wall of the tank and passes over the return rollers with its return pass extending beneath the vacuum chamber from the removal station to the filter bed, said return rollers being disposed only in engagement with an inner surface of the loop, whereby in use the surface of the endless loop on which the filtered material is deposited always faces outwardly of the loop, and wherein pressure means for keeping the side edges of the filter fabric substantially in sealing contact with the corresponding sides of the screen of the filter bed are provided in the tank above the said filter fabric, said pressure means being comprises of a pair of endless entrainment chain means disposed above said endless loop of filter fabric in contact with said side edges of said fabric.

2. A filter according to claim 1, wherein the station for the removal of the filtered material includes a drying unit comprising a suction source and situated immediately upstream of one of said return rollers in correspondence with which the dried filtered material is separated from the fabric.

3. A filter according to claim 2, further comprising a compensation vessel which can be connected to the vacuum chamber of the tank, and wherein the suction source is constituted by an ejector by means of which the filtered liquid is drawn through the filter bed is supplied to the said compensation vessel.

4. A filter according to claim 3, further including nozzles which can be supplied with the filtered liquid admitted to the compensation vessel in order to wash the filter fabric upstream of the filter bed.

5. A filter according to claim 1, wherein the side edges of the filter fabric have longitudinal strips, and the pair of endless entrainment chains are provided with rollers which are offset from the central parts of their links, the rollers being arranged in rolling contact with respective guides carried by the tank above the sides of the screen of the filter bed so as to urge the links of the chains against the longitudinal strips of the filter fabric.

6. A filter according to claim 5, further including spaced transverse elements connecting the said chains.

7. A filter according to claim 1, wherein the filter fabric is formed by portions which are interconnected by fasteners.

* * * * *